(12) United States Patent
Kim et al.

(10) Patent No.: US 8,126,068 B2
(45) Date of Patent: Feb. 28, 2012

(54) METHOD AND DEVICE FOR ESTIMATING CHANNEL OF UPLINK SIGNAL IN WIRELESS COMMUNICATION SYSTEM

(75) Inventors: Hyung Seob Kim, Anyang-Si (KR); Kang Min Lee, Yongin-Si (KR)

(73) Assignee: SeAH Networks Co., Ltd., Gangnam-gu (KR)

( * ) Notice: Subject to any disclaimer, the term of this patent is extended or adjusted under 35 U.S.C. 154(b) by 837 days.

(21) Appl. No.: 12/161,182

(22) PCT Filed: Jan. 12, 2007

(86) PCT No.: PCT/KR2007/000219
§ 371 (c)(1),
(2), (4) Date: Jul. 17, 2008

(87) PCT Pub. No.: WO2007/083902
PCT Pub. Date: Jul. 26, 2007

(65) Prior Publication Data
US 2009/0003479 A1  Jan. 1, 2009

(30) Foreign Application Priority Data

Jan. 17, 2006 (KR) .......................... 10-2006-0004729

(51) Int. Cl.
*H04K 1/10* (2006.01)
*H04L 27/06* (2006.01)
(52) U.S. Cl. ....................................... 375/260; 375/340
(58) Field of Classification Search .................. 375/260, 375/316, 340
See application file for complete search history.

(56) References Cited

U.S. PATENT DOCUMENTS

| 6,947,373 | B2 | 9/2005 | Siala et al. | |
|---|---|---|---|---|
| 2005/0105461 | A1 | 5/2005 | Mitsugi | |
| 2005/0265490 | A1* | 12/2005 | Sestok et al. | 375/340 |
| 2006/0222099 | A1* | 10/2006 | Varadarajan et al. | 375/260 |
| 2006/0269016 | A1* | 11/2006 | Long et al. | 375/340 |
| 2010/0124297 | A1* | 5/2010 | Papasakellariou et al. | 375/260 |

FOREIGN PATENT DOCUMENTS

| EP | 1335552 | 8/2003 |
|---|---|---|
| KR | 10-2005-0064718 | 6/2005 |

* cited by examiner

*Primary Examiner* — Don N Vo (57) ABSTRACT

Provided are a method and device for estimating a channel in a wireless communication system, and more particularly, a method of estimating a channel of an uplink signal in an orthogonal frequency division multiplexing (OFDM)/orthogonal frequency division multiple access (OFDMA) communication system supporting the Institute of Electrical and Electronics Engineers (IEEE) 802.16d/e standards and a channel estimation device employing the method. The method includes the steps of: extracting pilot symbols included in the received signal and estimating linear phase values using the pilot symbols; interpolating the pilot symbols along a time axis and obtaining first channel responses; interpolating the pilot symbols along a frequency axis according to the first channel responses and obtaining second channel responses; and calculating channel estimation values using the second channel responses and the linear phase values.

24 Claims, 8 Drawing Sheets

METHOD AND DEVICE FOR ESTIMATING CHANNEL OF UPLINK SIGNAL IN WIRELESS COMMUNICATION SYSTEM

CROSS-REFERENCE TO RELATED APPLICATIONS

The present application is a National Phase of PCT/KR2007/000219, filed Jan. 12, 2007, which claims the benefit of Korean Application No. 10-2006-0004729, filed Jan. 17, 2006, the entire disclosures of which are incorporated by reference herein.

FIELD OF THE INVENTION

The present invention relates to a method and device for estimating a channel in a wireless communication system, and more particularly, to a method of estimating a channel of an uplink signal in an orthogonal frequency division multiplexing (OFDM)/orthogonal frequency division multiple access (OFDMA) communication system supporting the Institute of Electrical and Electronics Engineers (IEEE) 802.16d/e standards, and a channel estimation device employing the method.

BACKGROUND OF THE INVENTION

Orthogonal frequency division multiplexing (OFDM)/orthogonal frequency division multiple access (OFDMA) systems use not a single-carrier modulation technique but a multi-carrier modulation technique that transmits data in parallel using a plurality of sub-carriers having mutual orthogonality. According to the OFDMA technique, OFDMA symbols are respectively bundled and transmitted over predetermined sub-channels by sub-carriers, thereby transmitting data.

In a wireless communication system, transmitted signals are generally affected by multi-paths having different amplitudes and delays. Due to such multi-paths, fading occurs and thus signals received by a receiver are distorted. In order to compensate for distortion of received signals caused by the above-mentioned problem and to ensure mobility of communication terminals, means for estimating a channel estimation value and equalizing a received signal according to the channel estimation value is in demand.

As is well known to those skilled in the art, in order to estimate a channel of a signal transmitted and received in a wireless communication system, a training symbol previously defined between a transmitter and a receiver is necessary. In particular, in a noisy environment causing multi-echoes to a signal transmitted through an air channel, channel estimation is performed to equalize a received signal and accurately decode the received signal using pilot symbols included in the signal. Such pilot symbols are transmitted within all OFDMA symbols of an uplink frame.

Figure 1:
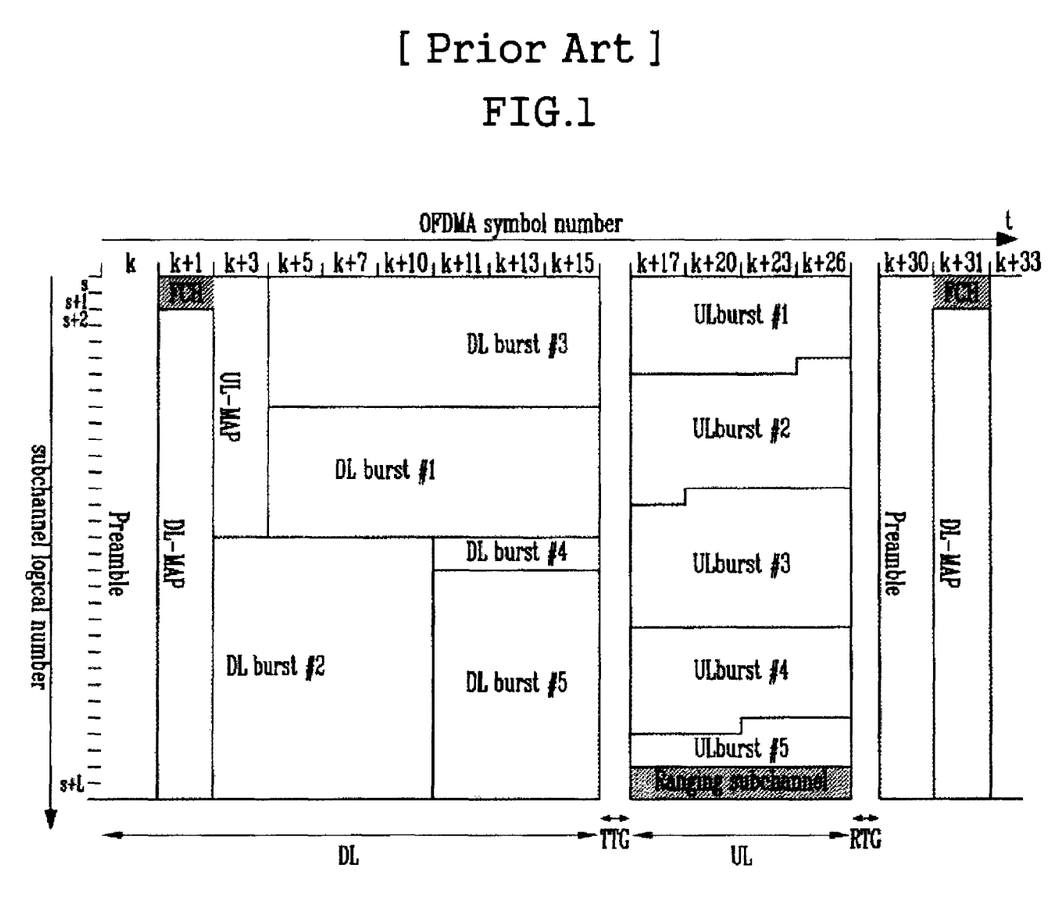
FIG. 1 illustrates an example of an orthogonal frequency division multiplexing (OFDM) time division duplex (TDD) frame structure based on the Institute of Electrical and Electronics Engineers (IEEE) 802.16d/e standards to which the present invention will be applied.

FIG. 1 illustrates an example of an OFDM time division duplex (TDD) frame structure based on the wireless broadband Internet (WiBro) standards to which the present invention will be applied. The frame structure illustrated in FIG. 1 conforms to the Institute of Electrical and Electronics Engineers (IEEE) 802.16d/e standards.

Referring to FIG. 1, a transmission (Tx)/reception (Rx) transition gap (TTG) is inserted between a downlink and an uplink, and an Rx/Tx transition gap is inserted between the end of a frame and the start of another frame. In OFDMA systems, data is transmitted in an uplink through sub-channels respectively allocated to subscribers. Such an uplink frame may be composed of a plurality of zones. The respective zones are classified according to an OFDMA sub-channel allocation scheme, and may vary according to each OFDMA symbol. The uplink sub-channel allocation scheme uses channel modes such as uplink (UL)-partial usage of sub-channels (PUSC), UL-optional PUSC (OPUSC), UL band-adaptive modulation and coding (AMC), etc. A ranging sub-channel illustrated in the lower end of the uplink frame illustrated in FIG. 1 is used for uplink synchronization and power control between a mobile terminal and a base station, bandwidth request of a mobile terminal, and so on. The WiBro standards define 4 modes which are an initial ranging mode, a periodic ranging mode, a hand off ranging mode, and a bandwidth ranging mode.

In an uplink, synchronization is performed by the above-mentioned ranging process. In such an uplink, since channel environments of mobile terminals are different from each other, the point of a signal receiving time may vary and the amount of received power also may vary. A base station receives uplink signals of several mobile terminals passed through different channel environments and thus must estimate a channel of each user.

This specification improves a method of estimating a channel for such an uplink signal and suggests a channel estimation method and device for enhancing accuracy of channel estimation in a time-variant environment as well as a time-invariant environment.

SUMMARY OF THE INVENTION

The present invention is directed to a channel estimation method of a receiver capable of improving accuracy of channel estimation in a time-variant channel environment as well as a time-invariant environment.

The present invention is also directed to simultaneously performing linear phase estimation for pilot symbols during channel estimation using the pilot symbols, thereby more accurately estimating a channel.

The present invention is also directed to enhancing data receiving performance of a receiver in a wireless communication system by suggesting an improved channel estimation method.

The present invention is also directed to estimating a channel of an uplink signal using only pilot symbols other than preambles.

The present invention is also directed to a channel estimation method more robust to channel environments and having higher accuracy due to a predetermined averaging operation for estimating a channel of an uplink signal using pilot symbols.

One aspect of the present invention provides a method of estimating a channel of a received signal, the method comprising the steps of: extracting pilot symbols included in the received signal and estimating linear phase values using the pilot symbols; interpolating the pilot symbols along a time axis and obtaining first channel responses; interpolating the pilot symbols along a frequency axis according to the first channel responses and obtaining second channel responses; and calculating channel estimation values using the second channel responses and the linear phase values.

Another aspect of the present invention provides a device for estimating a channel of a received signal, the apparatus comprising: a time-axis interpolator for interpolating pilot symbols included in the received signal along a time axis and obtaining first channel responses; a frequency-axis interpolator for interpolating the pilot symbols along a frequency axis according to the first channel responses and obtaining second channel responses; and a channel estimation calculator for calculating channel estimation values using the second channel responses.

According to the present invention, a channel estimation method of a receiver capable of improving accuracy of channel estimation in a time-variant channel environment as well as a time-invariant channel environment is provided.

In addition, according to the present invention, it is possible to more accurately estimate a channel by simultaneously performing linear phase estimation for pilot symbols during channel estimation using the pilot symbols.

In addition, according to the present invention, it is possible to improve data receiving performance of a receiver in a wireless communication system.

In addition, according to the present invention, a channel of an uplink signal can be estimated using only pilot symbols instead of preambles.

In addition, according to the present invention, it is possible to provide a channel estimation method more robust to channel environments and having higher accuracy due to a predetermined averaging operation for estimating a channel of an uplink signal using pilot symbols.

DETAILED DESCRIPTION OF THE PREFERRED EMBODIMENTS

In this specification, the terminology "communication terminal" refers to a communication terminal supporting an orthogonal frequency division multiplexing (OFDM) technique or an orthogonal frequency division multiple access (OFDMA) technique. Preferably, the terminology "communication terminal" means a communication terminal supporting uplink (UL) band-adaptive modulation and coding (AMC) channel mode in a wireless communication system using the Institute of Electrical and Electronics Engineers (IEEE) 802.16d/e standards, wireless broadband Internet (WiBro) standards, and worldwide interoperability for microwave access (WiMAX) standards.

In addition, the terminology "wireless communication system" used in this specification may refer to a system based on at least one of the IEEE 802.16d/e standards, WiBro standards, and WiMAX standards.

In addition, the terminology "symbol" used in this specification refers to an OFDMA or OFDM symbol.

Hereinafter, a method and device for estimating a UL channel in a wireless communication system according to exemplary embodiments of the present invention will be described in detail with reference to the appended drawings. However, the present invention is not limited to the exemplary embodiments disclosed below, but can be implemented in various forms. Therefore, the present exemplary embodiments are provided for complete disclosure of the present invention and to fully convey the scope of the present invention to those of ordinary skill in the art.

Figure 2:
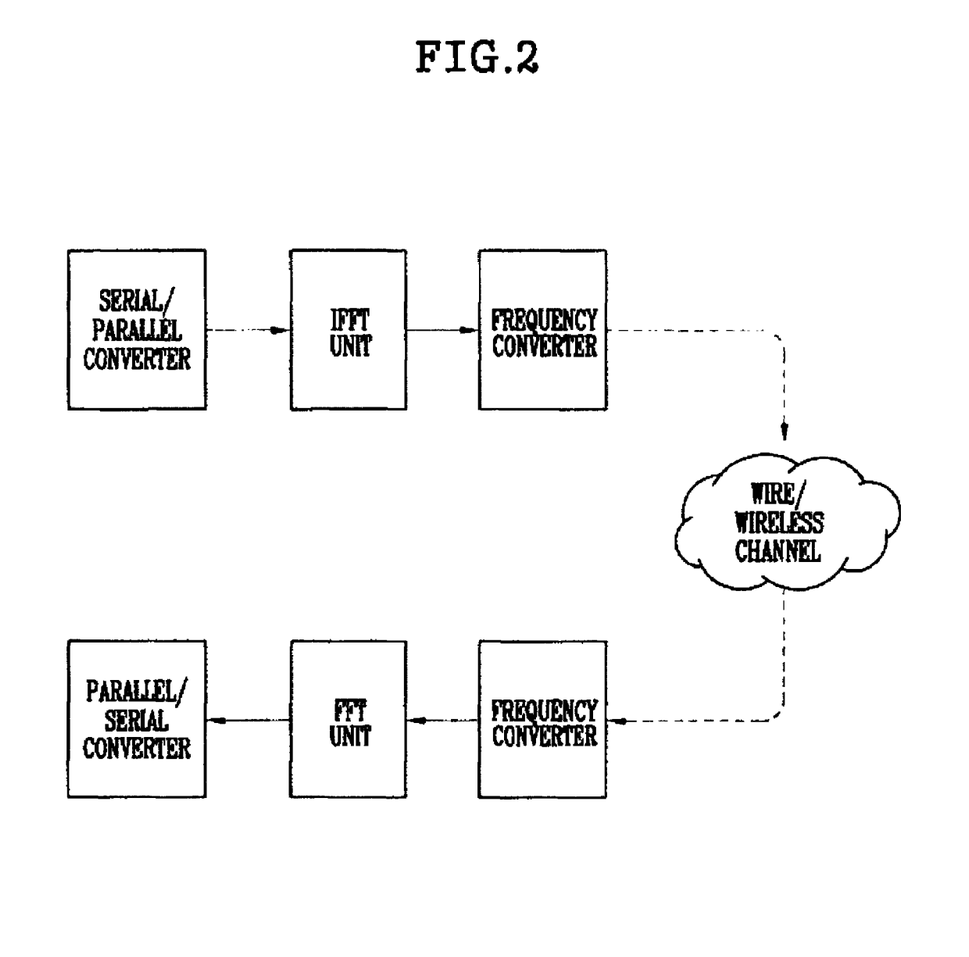
FIG. 2 is a block diagram showing a configuration of a general OFDM/orthogonal frequency division multiple access (OFDMA) transceiver.

FIG. 2 is a block diagram showing a configuration of a general OFDM/OFDMA transceiver. As illustrated in FIG. 2, the general OFDM/OFDMA transceiver comprises a serial/parallel converter, a fast Fourier transform (FFT) device or inverse fast Fourier transform (IFFT) device, and a frequency converter.

The serial/parallel converter of a transmitting unit converts a data stream input in serial into parallel data streams numbering the same as sub-carriers, and the IFFT device performs an IFFT operation on each parallel data stream. The IFFT-processed data is converted back into serial data and transmitted after frequency conversion. A receiving unit receives a signal transmitted through a wired/wireless channel, and outputs data after a demodulation process that is the reverse of a process performed by the transmitting unit.

Figure 3:
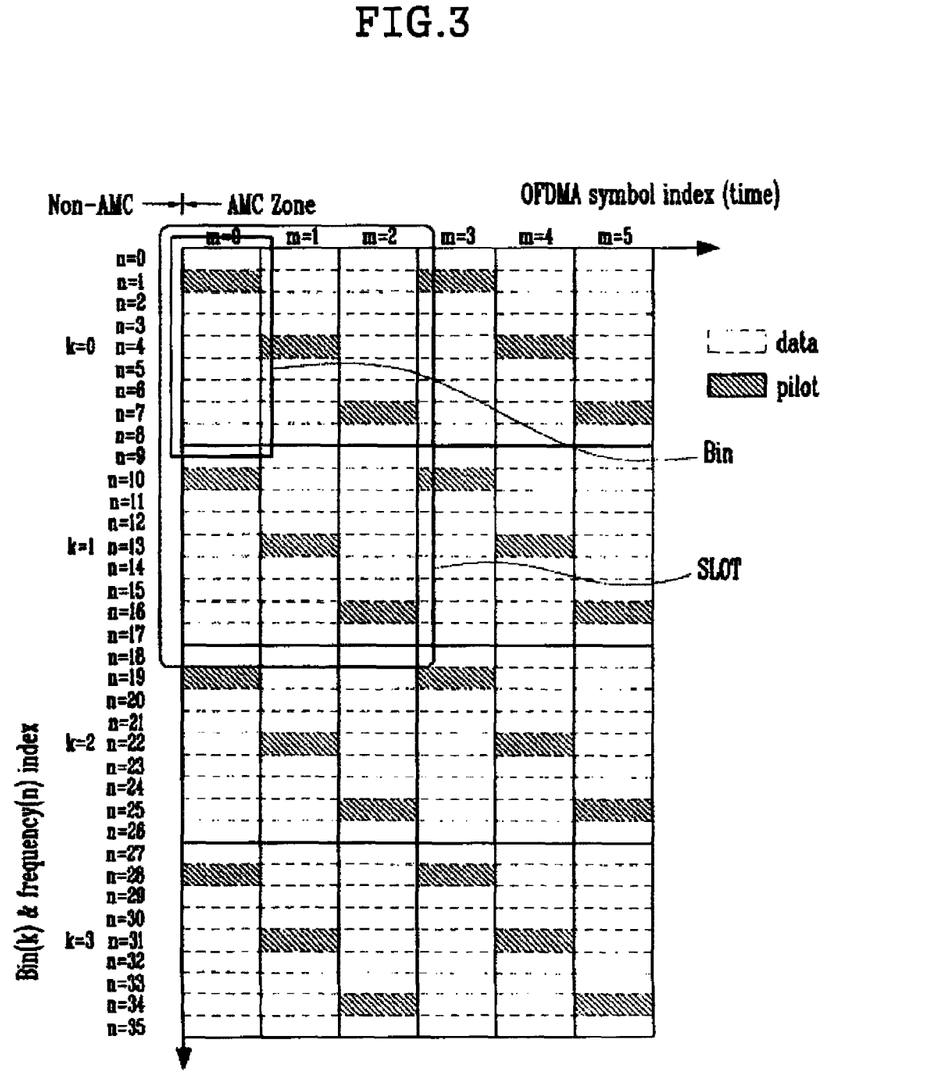
FIG. 3 illustrates an example of a frame structure of an uplink (UL) signal in an OFDMA TDD frame structure based on the IEEE 802.16d/e standards according to the present invention.

FIG. 3 illustrates an example of a frame structure of a UL signal in an OFDMA time division duplex (TDD) frame structure based on the IEEE 802.16d/e standards according to the present invention.

Referring to FIG. 3, an AMC zone of a UL signal is illustrated in an OFDMA TDD frame. A UL frame may be divided into a UL partial usage of sub-channel (PUSC) section, a UL-optional PUSC (OPUSC) section and a UL band-AMC sub-channel section, and FIG. 3 illustrates an example of the UL band-AMC sub-channel section.

Referring to FIG. 3, the band-AMC sub-channel comprises pilot symbols, data symbols and null symbols. A pilot symbol is allocated to one specific sub-carrier in a bin comprising 9 serial sub-carriers. The position of a pilot symbol in a bin may vary according to the index of the symbol. FIG. 3 illustrates the positions of pilot symbols determined by a variable set.

Figure 4:
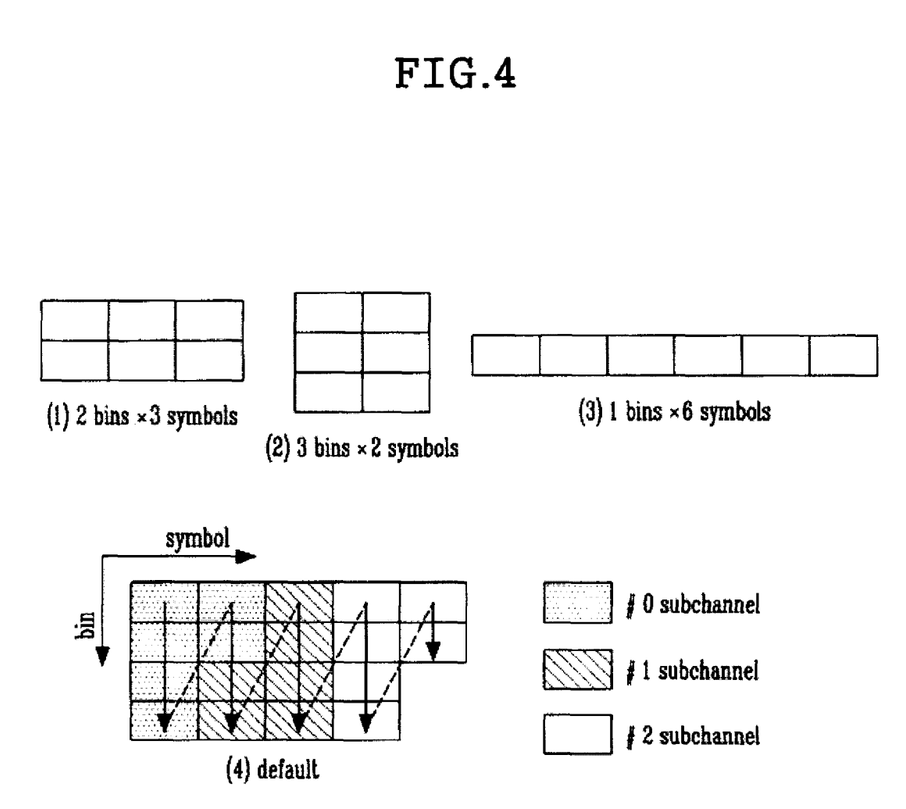
FIG. 4 illustrates examples of slots constituting a channel of a UL band-adaptive modulation and coding (AMC) mode in an OFDMA TDD frame structure based on the IEEE 802.16d/e standards according to the present invention.

In order to configure band-AMC sub-channels, all sub-carriers having symbols other than null symbols are divided in bin units, and M adjacent bins are bundled and constitute one band. Basic units constituting a band-AMC sub-channel are bins, and one band-AMC sub-channel includes slots comprising 6 bins. For example, referring to FIG. 3, a 4-slot data burst is illustrated, which exists in a UL band-AMC channel mode zone and has a 2*2 slot structure. The component ratio of such a band-AMC subchannel can be changed according to each frame. Such a band-AMC sub-channel may comprise 2 bins * 3 symbols, 3 bins * 2 symbols, and 1 bin * 6 symbols according to embodiments. Here, after indexes are specified in sequence in directions of a frequency axis and a time axis within each band, bins and symbols are bundled into sub-channels comprising a combination of 6 bins and symbols positioned in sequence from the front of the structure. A sub-channel comprising 6 bins as described above is referred to as a slot. FIG. 4 illustrates examples of a configuration of such a slot.

FIG. 4 illustrates examples of slots constituting a channel of a UL band-AMC mode in an OFDMA TDD frame structure based on the IEEE 802.16d/e standards according to the present invention.

Referring to FIG. 4, in the UL band-AMC mode, subchannels may have structures of 2 bins*3 symbols (reference numeral (1)), 3 bins*2 symbols (reference numeral (2)), and 1 bin*6 symbols (reference numeral (3)). A method of processing 6 bins included in one slot is illustrated with reference numeral (4).

Figure 5:
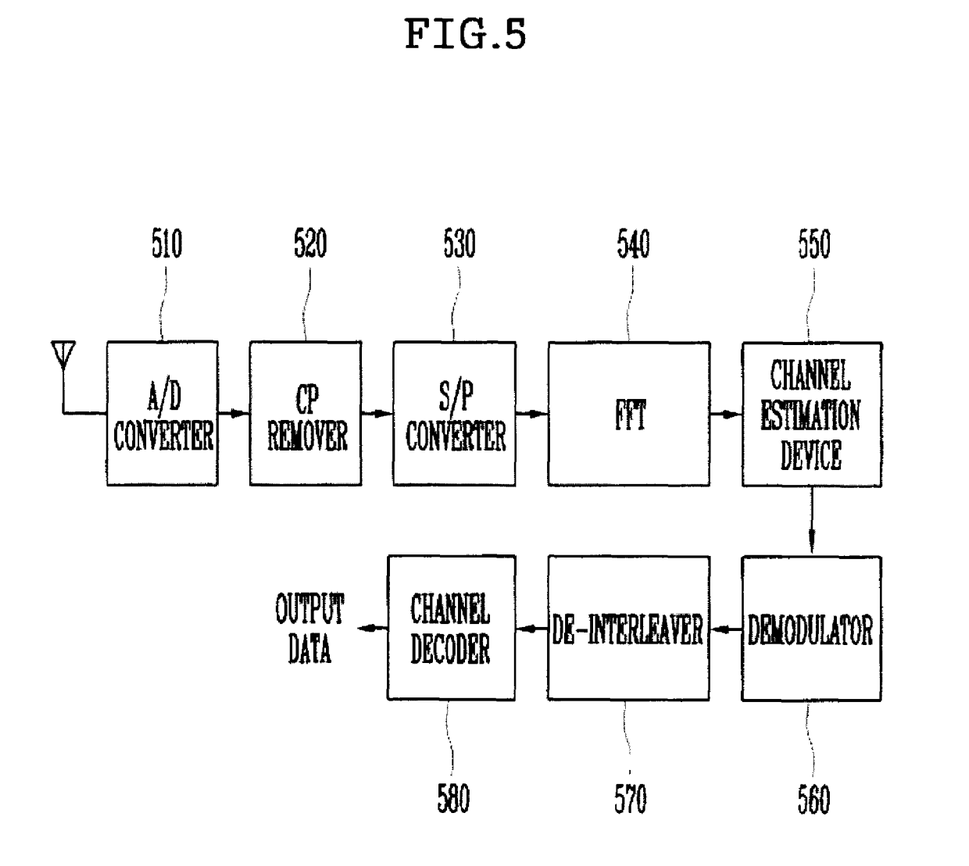
FIG. 5 is a block diagram of a UL signal receiver including a device for estimating a channel according to an exemplary embodiment of the present invention.

FIG. 5 is a block diagram of a UL signal receiver including a channel estimation device according to an exemplary embodiment of the present invention. A radio frequency (RF) signal received by an antenna of the receiver is converted into a baseband signal and quantized by an analog/digital (A/D) converter 510. The quantized signal is processed by a cyclic prefix (CP) remover 520 and a serial/parallel (S/P) converter 530, and then Fourier-transformed by an FFT unit 540.

The CP remover 520 removes CPs added to the received signal. A CPs which is a kind of overhead, functions as a guard interval for preventing inter-symbol interference (ISI) in an OFDMA/OFDM symbol. The received signal, from which the CPs have been removed, is input to the S/P converter 530.

The S/P converter 530 converts the received signal input in serial into parallel received signals numbering the same as sub-carriers.

After being converted into the parallel received signals by the S/P converter 530, the received signals are Fourier-transformed by the FFT unit 540 and input to a channel estimation device 550 according to the present invention, thereby calculating channel estimation values by a channel estimation method according to the present invention. The channel estimation values are input to a predetermined channel compensation device (not shown in the drawings), and channel compensation is performed.

A configuration of the channel estimation device 550 shown in FIG. 5 will be described in further detail below with reference to FIGS. 6 and 7.

Figure 6:
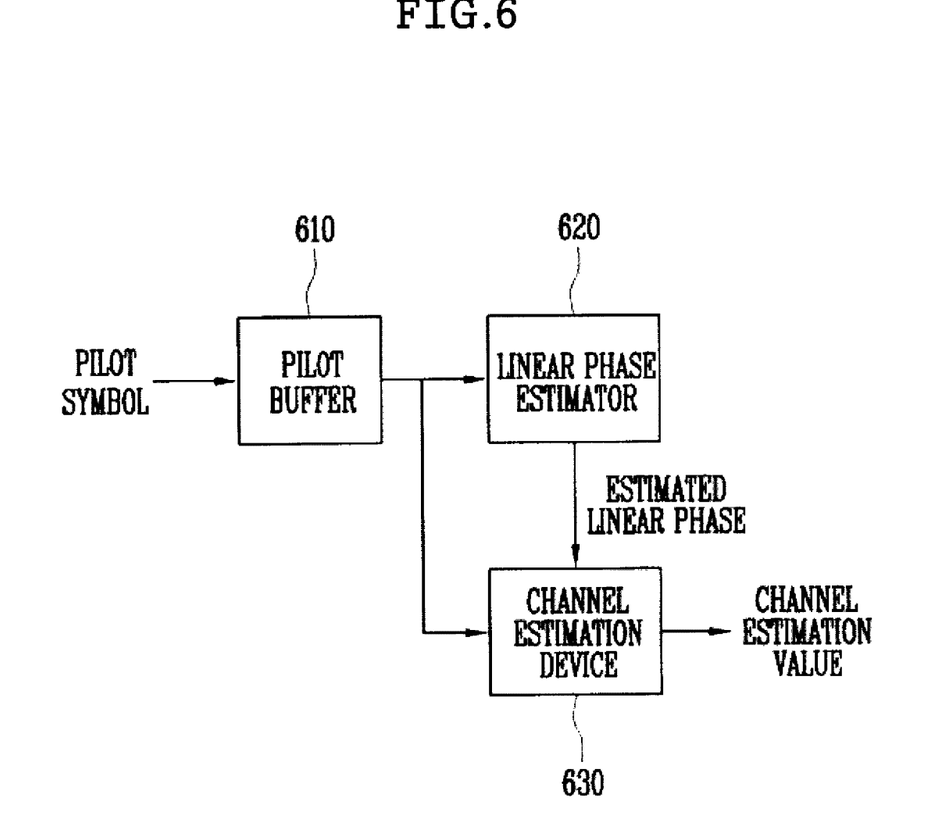
FIG. 6 is a block diagram of an example of a channel estimation device shown in FIG. 5.

FIG. 6 is a block diagram of an example of the channel estimation device shown in FIG. 5.

Referring to FIG. 6, pilot symbols are extracted from a received signal Fourier-transformed by an FFT unit and then buffered by a pilot buffer 610. The pilot symbols buffered by the pilot buffer 610 are input to a linear phase estimator 620, which estimates linear phases between the pilot symbols. The estimated linear phase values are input to a channel estimation device 630 according to the present invention.

Modules constituting the channel estimation device 630 according to the present invention shown in FIG. 6 and operation of the modules will be described in further detail below with reference to FIG. 7.

Figure 7:
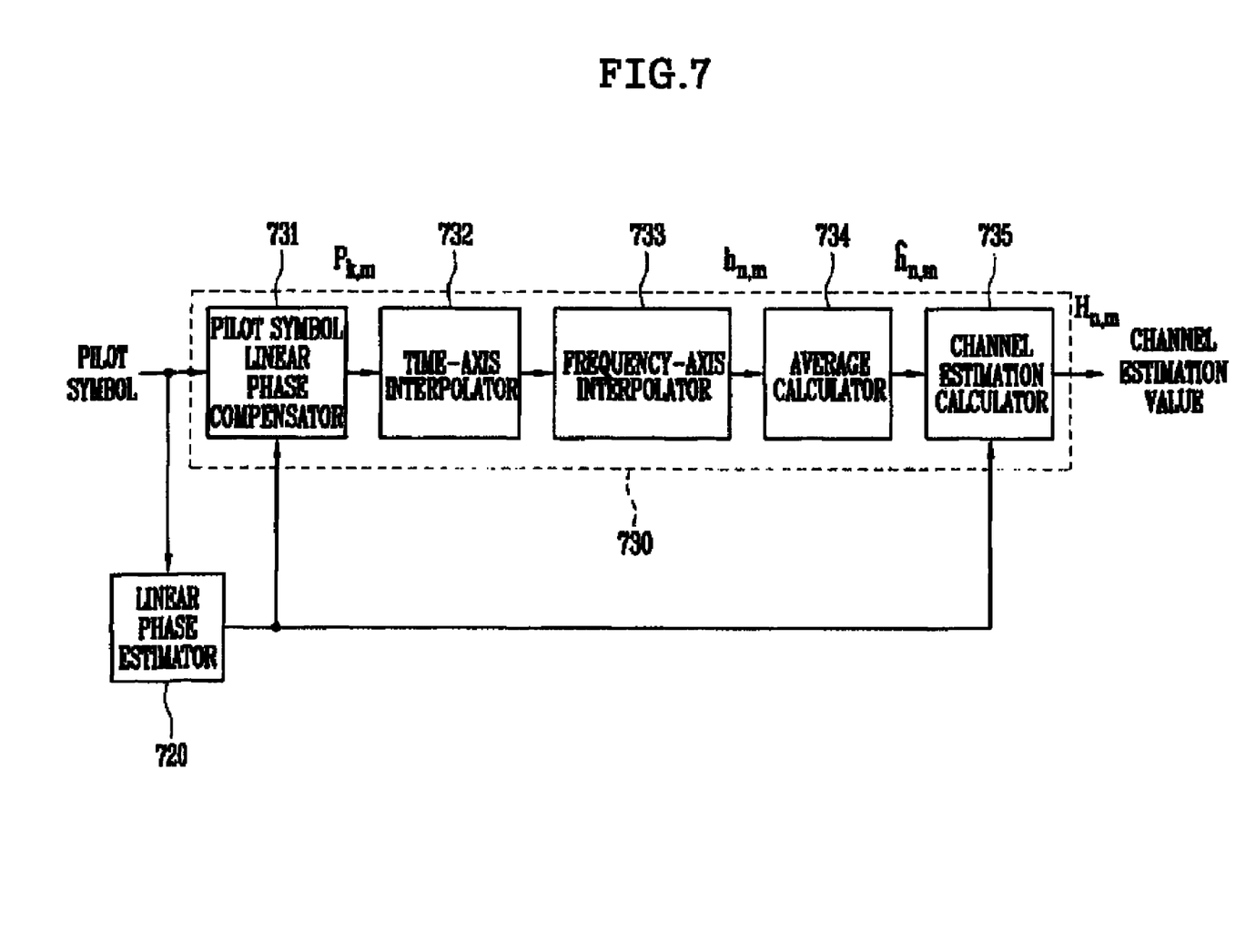
FIG. 7 is a block diagram of an example of a channel estimation device shown in FIG. 6.

FIG. 7 is a block diagram of an example of the channel estimation device 630 shown in FIG. 6.

A channel estimation device 730 shown in FIG. 7 may comprise a pilot symbol linear phase compensator 731, a time-axis interpolator 732, a frequency-axis interpolator 733, an average calculator 734 and a channel estimation calculator 735.

The channel estimation device 730 estimates a channel of a received signal using pilot symbols input from the pilot buffer 610 shown in FIG. 6 and linear phase values input from a linear phase estimator 720.

In order to calculate channel responses using pilot symbols having the same phase, the pilot symbol linear phase compensator 731 equally calibrates the phase between the respective pilot symbols using the linear phase values estimated by the linear phase estimator 720 when sub-carrier indexes of pilot symbols included in the same slot are different from each other. More specifically, in the UL band-AMC channel mode zone shown in FIG. 3, the positions of pilot symbols are different in a symbol section of the time domain, and the same pattern of pilot symbol positions is repeated at symbol section periods.

The pilot symbol linear phase compensator 731 compensates for values θ, which are estimated for restored pilot symbols $P_{k,m}$ by the linear phase estimator 720, for a value, thereby equalizing the phases between pilot symbols included in one slot. The compensation of such pilot symbol phases may be expressed by a formula given below. In the following formula, a value $\theta_{slot}$ may be estimated for each slot, and the estimated value $\theta_{slot}$ may be applied to only pilot symbols included in the cor-slot responding slot.

$$P_{k,m} = p_{k,m} \cdot e^{j \cdot \theta_{lost} \{9(k \bmod 2) + 3(m \bmod 3)\}}$$ [Formula 1]

(k: bin index; m: symbol index; 0: linear phase value estimated; mod: modulo slot operation)

The pilot symbol $P_{k,m}$ calculated by Formula 1 is input to the time-axis interpolator 732.

After the phases between pilot symbols are equally calibrated by the pilot symbol linear phase compensator 731 as described above, the time-axis interpolator 732 performs interpolation on adjacent pilot symbols along the time axis among pilot symbols having the same sub-carrier index. For the interpolation on adjacent pilot symbols along the time axis, an appropriate weight may be given to each pilot symbol. By the interpolation process, first channel responses between pilot symbols having the same sub-carrier index are obtained. The first channel responses are channel responses for one of three sub-carriers on the frequency axis, respectively. In addition, pilot symbol copy may be included.

As is well known to those skilled in the art, when it is assumed that two objects of interpolation are A and B, weights for A and B each are a and b, and an interpolation result value calculated using A and B is C, the following equation is obtained: C=aA+bB (0<a<1, 0<b<1, a+b=1). The interpolation process may use linear interpolation, secondary interpolation, cubic spline interpolation, interpolation with a low-pass filter, etc., which may be appropriately selected according to system requirements, symbol positions depending on different channels, or so on.

The frequency-axis interpolator 733 performs interpolation on adjacent pilot symbols along the frequency axis among pilot symbols having the same symbol index using the first channel responses. During the interpolation on adjacent pilot symbols along the frequency axis, an appropriate weight may be given to each pilot symbol. By the interpolation process, second channel responses h between adjacent pilot symbols along the frequency axis can be obtained. In addition, pilot symbol copy may be included.

The average calculator 734 performs an averaging operation on the second channel responses $h_{n,m}$ obtained from the frequency-axis interpolator 733 at intervals of an appropriate window size along the time axis, thereby obtaining an average channel response $$\hat{h}_{n,m}$$

By the averaging operation of the average calculator 734, channel estimation values robust to various channel environments can be obtained, and accuracy of the channel estimation values can also be improved. The average channel response $$\hat{h}_{n,m}$$

can be calculated by a formula given below.

$$\hat{h}_{n,m} = \frac{1}{N} \sum_{m=m-(N-1)/2}^{m+(N-1)/2} h_{n,m} \qquad \text{[Formula 2]}$$

(N: symbol size to be processed by the averaging operation along the time axis)

In Formula 2, N May be an Odd Value. In Addition, when there is No Former or Latter value to be processed by the averaging operation as the first or last symbol, a channel response of the corresponding symbol can be used as is.

The channel estimation calculator 735 calculates channel estimation values using linear phase values according to respective sub-carrier indexes included in the same slot and the average channel response calculated by the average calculator 734. The channel estimation values may be calculated by compensating the average channel response calculated by the average calculator 734 for the linear phase values calculated by the linear phase estimator 720. More specifically, the channel responses h of adjacent pilot symbols and the average channel response $$\hat{h}_{n,m}$$

are calculated. Then, the phases of pilot symbols included in the same slot, which are equally calibrated before the pilot symbols are processed by the time-axis interpolator 732 and the frequency-axis interpolator 733, are differentially restored along the frequency axis, thereby calculating a channel estimation value H for each symbol. Such calculation may be performed using a formula given below.

$$H_{n,m} = \hat{h}_{n,m} \cdot e^{-j \cdot \theta_{slot} \cdot \{(n \bmod 18)-1\}} \qquad \text{[Formula 3]}$$

$\theta_{slot}$: linear phase value estimated for each slot

Referring back to FIG. 5, the channel estimation values generated by the channel estimation device 550 according to the present invention are input to a channel compensator (not shown in the drawings), and the channel of a received signal is compensated. The received signal whose channel is compensated is equalized by an equalizer (not shown in the drawings), and a demodulator 560 demodulates the equalized signal. The demodulated signal is de-interleaved by a de-interleaver 570, and a channel decoder 580 finally performs channel decoding.

The channel estimation device illustrated in FIGS. 6 and 7 may be implemented in a receiver of a base station.

Figure 8:
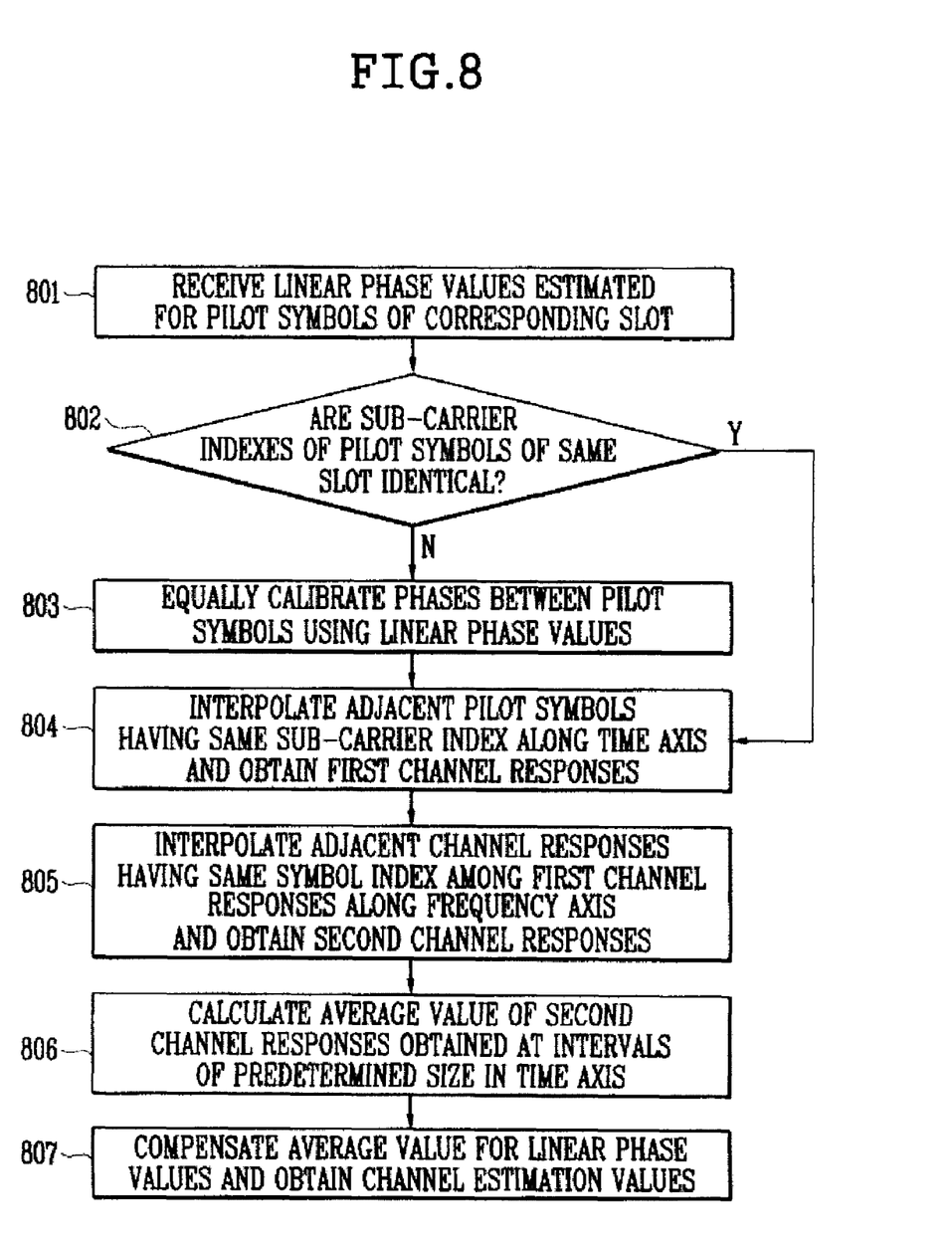
FIG. 8 is a flowchart showing a method of estimating a channel performed by a channel estimation device according to an exemplary embodiment of the present invention.

FIG. 8 is a flowchart showing a method of estimating a channel performed by a channel estimation device according to an exemplary embodiment of the present invention.

The channel estimation method performed by the channel estimation device in a wireless communication system according to an exemplary embodiment of the present invention will be described in detail below with reference to FIG. 8.

In step 801, the channel estimation device according to the present invention receives linear phase values estimated for pilot symbols from the linear phase estimator 720 shown in FIG. 7.

In step 802, it is determined whether sub-carrier indexes of pilot symbols included in the same slot are identical or not. When the sub-carrier indexes of pilot symbols are not identical, phases between respective pilot symbols are uniformly calibrated using the linear phase values estimated by the linear phase estimator 720 in step 803.

In addition, when it is determined in step 802 that the sub-carrier indexes of pilot symbols are identical, step 803 is skipped and the procedure proceeds to step 804.

After the phases between respective pilot symbols included in the same slot are equally calibrated in step 803, interpolation is performed on adjacent pilot symbols along the time axis among pilot symbols having the same sub-carrier index in step 804. For the interpolation on adjacent pilot symbols along the time axis in step 804, an appropriate weight for each pilot symbol may be given. By the interpolation process, first channel responses between pilot symbols having the same sub-carrier index are obtained. The first channel responses are channel responses for one of three sub-carriers on the frequency axis, respectively.

In step 805, interpolation is performed on adjacent pilot symbols along the frequency axis among pilot symbols having the same symbol index using the first channel responses obtained in step 804. For the interpolation on adjacent pilot symbols along the frequency axis in step 805, an appropriate weight for each pilot symbol may be given. By the interpolation process, second channel responses between adjacent pilot symbols along the frequency axis can be obtained.

In step 806, the averaging operation is performed on the second channel responses obtained in step 805 at intervals of an appropriate window size along the time axis, thereby obtaining an average channel response. In step 806, channel estimation values robust to various channel environments can be obtained, and accuracy of the channel estimation values can also be improved.

After steps 801 to 806, in step 807, channel estimation values are calculated using the linear phase values that are received from the linear phase estimator 720 and vary according to sub-carrier indexes included in the same slot and the average channel response obtained in step 806. In step 807, the operation of compensating the average channel response obtained in step 806 for the linear phase values may be performed to calculate the channel estimation values.

The channel estimation values calculated in step 807 are input to the channel compensator, and thus the channel of a received signal is compensated. The channel estimation method performed by a receiver of a wireless communication system according to the present invention can be embodied as computer program commands and recorded on computer-readable media. The computer-readable media may include program commands, data files, data structures, etc. separately or compositely. The program commands recorded in the media may be particularly designed and configured for the present invention, or known and used by those skilled in the computer software field. The computer-readable media may be magnetic media such as a hard disk, a floppy disk and magnetic tape, optical media such as a compact disk read-only memory (CD-ROM) and a digital versatile disk (DVD), magneto-optical media such as floptical disk, and hardware devices such as a ROM, a random-access memory (RAM), a flash memory, etc., particularly implemented to store and execute program commands. Also, the media may be transmission media such as optical or metal lines, waveguides, etc. including carriers delivering signals indicating program commands, data structures, and so on. The program commands may be machine language codes produced by a compiler and high-level language codes that can be executed by computers using an interpreter, etc. In order to perform the operations of the present invention, the hardware devices may be implemented to operate as at least one software module, and vice versa.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of estimating a channel of a received signal in a wireless communication system, the method comprising the steps of: extracting pilot symbols included in the received signal and estimating linear phase values using the pilot symbols', interpolating the pilot symbols along a time axis and obtaining first channel responses; interpolating the pilot symbols along a frequency axis according to the first channel responses and obtaining second channel responses; and calculating channel estimation values using the second channel responses and the linear phase values.

2. The method of claim 1, wherein the pilot symbols interpolated along the time axis have the same sub-carrier indexes.

3. The method of claim 1, wherein the pilot symbols interpolated along the frequency axis have the same symbol indexes.

4. The method of claim 2, wherein the step of interpolating the pilot symbols along the time axis further comprises the step of:
equally calibrating phases of the pilot symbols using the estimated linear phase values when sub-carrier indexes of the pilot symbols included in a slot are different from each other.

5. The method of claim 1, further comprising the step of:
performing an averaging operation on second channel responses adjacent along the time axis among the second channel responses and calculating an average channel response,
wherein the channel estimation values are calculated using the average channel response and the linear phase values.

6. The method of claim 5, wherein the average channel response is calculated by averaging the second channel responses obtained at intervals of a predetermined window size along the time axis.

7. The method of claim 1, wherein the wireless communication system is based on Institute of an Electrical and Electronics Engineers (IEEE) 802.16d/e standard, a wireless broadband Internet (WiBro) standard, or a worldwide interoperability for microwave access (WiMAX) standard.

8. The method of claim 7, wherein the pilot symbols have a structure associated with an uplink (UL) band-adaptive modulation and coding (AMC) channel mode.

9. The method of claim 1, wherein the pilot symbols are included in one slot.

10. A method of estimating a channel in a uplink (UL) signal receiver of a wireless communication system, the method comprising the steps of:
receiving a UL signal;
extracting pilot symbols included in the UL signal and estimating linear phase values using the pilot symbols;
interpolating the pilot symbols along a time axis and a frequency axis and obtaining channel responses, and
obtaining channel estimation values using the channel responses and the linear phase values.

11. The method of claim 10, wherein the wireless communication system is based on an IEEE 802.16d/e standard, a WiBro standard, or a WiMAX standard, and the pilot symbols have a structure associated with a UL band-AMC channel mode.

12. The method of claim 10, wherein the UL signal receiver is a base station receiver.

13. A computer-readable recording medium, storing a program for executing the method according to claim 1.

14. A device for estimating a channel of a received signal in a wireless communication system, the device comprising:
linear phase estimator for estimating linear phase values using pilot symbols included in the received signal;
a time-axis interpolator for interpolating the pilot symbols along a time axis and obtaining first channel responses;
a frequency-axis interpolator for interpolating the pilot symbols along a frequency axis according to the first channel responses and obtaining second channel responses; and
a channel estimation calculator for calculating channel estimation values using the second channel responses and the linear phase values.

15. The device of claim 14, wherein the time-axis interpolator performs interpolation on pilot symbols having the same sub-carrier index.

16. The device of claim 14, wherein the frequency-axis interpolator performs interpolation on pilot symbols having the same symbol index.

17. The device of claim 15, further comprising:
a pilot symbol linear phase compensator for equally calibrating phases of pilot symbols using the linear phase values when sub-carrier indexes of the pilot symbols included in a slot are different from each other.

18. The device of claim 14, further comprising:
an average calculator for performing an averaging operation on second channel responses adjacent along the time axis among the second channel responses and calculating an average channel response, wherein the channel estimation calculator calculates the channel estimation values using the average channel response.

19. The device of claim 18, wherein the average calculator calculates the average channel response by averaging the second channel responses obtained at intervals of a predetermined window size along the time axis.

20. The device of claim 14, wherein the wireless communication system is based on an IEEE 802.16d/e standard, a WiBro standard, or a WiMAX standard.

21. The device of claim 20, wherein the pilot symbols have a structure associated with a UL band-AMC channel mode.

22. A UL signal receiver of a wireless communication system, comprising:
a receiver for receiving a UL signal;
a pilot extractor for extracting pilot symbols included in the UL signal;
linear phase estimator for estimating linear phase values using the pilot symbols; and
a channel estimation device for obtaining channel estimation values using the linear phase values and channel responses obtained by interpolating the pilot symbols along a time axis and a frequency axis.

23. The UL signal receiver of claim 22, wherein the wireless communication system is based on an IEEE 802.16d/e standard, a WiBro standard, or a WiMAX standard and wherein the pilot symbols have a structure associated with a UL band-AMC channel mode.

24. The UL signal receiver of claim 22, wherein the receiver is a base station receiver.

* * * * *